United States Patent Office 3,577,340
Patented May 4, 1971

3,577,340
METHOD FOR DISPERSING OIL SPILLS ON WATER
Stanley C. Paviak, Shaler Township, Warren K. Porter, Jr., Richland Township, Allegheny County, Pa., assignors to Gulf Research & Development Company, Pittsburgh, Pa.
No Drawing. Filed Apr. 16, 1970, Ser. No. 29,295
Int. Cl. B01d 17/04
U.S. Cl. 210—42                        9 Claims

ABSTRACT OF THE DISCLOSURE

A method for dissipating oil spills in water by dispersing the spilled oil with a novel alkylphenol ethoxylate having the structural formula

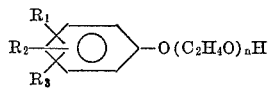

wherein $n$ is an integer from about 5 to about 25, $R_1$ is an alkyl group having at least 20 carbon atoms and $R_2$ and $R_3$ are independently selected from said alkyl group and hydrogen; and mixtures of the same.

---

This invention relates to an improved method for dispersing oils which are floating on bodies of water.

Substantial quantities of crude oil or partially or fully refined crude oil products are spilled, generally by accident, onto bodies of water. When the size of the spill is significant and particularly when it is in or near coastal waters, these spills can be very destructive to sea life, including bird life and to natural settings.

Many methods for handling these oil spills have been proposed and many of these methods have been tried with actual oil spills but none are fully satisfactory. The two primary means of handling spills are (1) the physical removal of the floating oil with suitably designed apparatus and/or absorbent material or (2) the dispersion of the oil within the body of water, such as the ocean, by use of an applied dispersing agent. Various modifications of both methods have been at the best only partially successful and at the worst wholly unsuccessful in terms of handling the spilled oil and avoiding the resultant natural diasters.

The dispersion method has been particularly unsatisfactory. It has been discovered through testing in actual spills that the dispersing agents themselves can be very harmful to the wildlife and sea life in the quantities used. It has also been found that good dispersions are not formed and those dispersions that do form quickly break down to reform the masses of oil. Additionally, it has been found that in many instances the oil is merely transformed to blobs which tend to collect on shore or sink to the bottom in the near vicinity of the spill with the resultant contamination and destruction of the wildlife and natural settings.

An effective dispersing agent for the dispersion of patches of oil floating on water should be easy to apply. It should readily mix with the oil and form a good stable dispersion with mild agitation. The oil should be distributed in the dispersion into particles, microscopic in size. And the dispersion should be sufficiently stable that wave action and water currents effect a distribution and dilution of the individual particles of the dispersion such that they cannot come together and reform masses of oil.

It is an object of our invention to provide a novel method for dispersing oil spills on water in which a novel dispersing agent is used. In accordance with the present invention, we have found that stable aqueous emulsions of crude oil and its products can be formed in water using an alkylphenol polyoxyethylene having at least 20 carbon atoms in the alkyl group and having from about five to about 25 moles of ethylene oxide per mole of alkylphenol. A particular advantage in using this material for dispersing the spilled oil in the water is that the oil is dispersed into a stable dispersion of fine particles. Thus the oil spill is dissipated over a wide area by water currents whereby it is rendered harmless by dilution and is eventually eliminated by biodegradation.

The finding that this alkylphenol polyoxyethylene is effective for the dispersion of oil spills on water is unexpected since as will be discussed more fully hereinbelow, the dispersing agents of the present invention do not significantly reduce the surface tension or the interfacial tension of an oil-water mixture in comparison with typical dispersants and therefore would not be expected to be suitable dispersing agents in accordance with the normally accepted relationship of surface tension and interfacial tension with emulsifiability. As used in this specification and claims, the terms "alkylphenol polyoxyethylene" and "alkylphenol ethoxylate" are synonyms for compounds having the general formula:

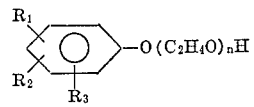

wherein $R_1$ is a straight chain or substantially straight chain alkyl group having between 20 and about 50 carbon atoms and $R_2$ and $R_3$ are independently selected from said alkyl group and hydrogen; and $n$ is an integer ranging in value from about five to about 25; and mixtures of said compounds in which the average carbon number of said alkyl groups is between about 22 and about 45 and the ratio of alkyl groups to aromatic rings in the mixture is between about 1 and about 1.7.

These alkylphenol polyoxyethylenes are generally prepared by the alkylation of phenol followed by the ethoxylation of the resulting alkylphenol with ethylene oxide. If the phenol is alkylated with a pure alpha-olefin, the resulting product is a mixture of alkylphenols having from one to three alkyl substituents. Since this mixture is very difficult to separate into the individual alkylphenols and since the mixture possesses in general the same basic properties and uses as the individual components, the mixture is preferably used for the preparation of the final product. In the common methods for preparing the higher alpha-olefins as used herein, a mixture of alpha-olefins is obtained and used for the alkylation, further increasing the variety of compounds in the alkylphenol product. In the ethoxylation stage, the number of ethoxy groups which unite with individual alkylphenol molecules varies over a wide range in which $n$ of the general formula represents the average for the mixture. Therefore, the final product in the preferred method of its preparation, utilizing a mixture of alpha-olefins without product separation, is a mixture of a substantial number of isomers and analogs of congeneric compositions having the same origin, nature and action.

The alkylphenols from which the emulsifying agents of the present invention are derived, can be prepared by reacting a higher alpha-olefin or a mixture thereof, for example, a $C_{22-28}$ fraction or a $C_{30+}$ alpha-olefin fraction having an average carbon number of between about 32 and about 45 with a mixture of $BF_3$ or other Lewis acid catalyst such as hydrogen fluoride or aluminum chloride and phenol at a temperature of about 0° to about 150° C., preferably from about 60° to about 90° C., until substantially all of the alpha-olefin is reacted. The reaction time may vary from about 10 minutes to about five hours, depending on the other reaction parameters, but as can be seen from the examples set out hereinbelow, a reaction time of about ½ to about three hours is generally suitable. The reaction pressure is not critical and depends in part, on the conditions and catalyst. When $BF_3$ is the catalyst, substantially atmospheric pressure is preferred as being most convenient. The resulting reaction mixture will normally comprise mono- and probably, di- and/or tri-alkylphenols in admixture with the catalyst and unreacted phenol.

After alkylation of the phenol is substantially complete, the reaction mixture can be treated with an alkaline agent, such as caustic soda or sodium carbonate, in sufficient quantities to neutralize the catalyst. Unreacted phenol is then removed from the neutralized mixture, for example, by steam distillation. The neutralized mixture of mono-, di- and tri-alkylphenols can then be treated with an alkali metal or oxide or hydroxide, such as sodium, or its oxide or hydroxide, in an inert atmosphere. In view of the high molecular weights of the mono-, di- and tri-alkylphenols, separation is too difficult to be practical, therefore, the mixture of compounds is used in the next step. The treated alkylphenol mixture is next polyethoxylated by a condensation reaction with ethylene oxide at a temperature of from about 100° C. to about 200° C., and preferably from about 150° C. to 180° C., until the average mole ratio of ethylene oxide to phenol in the resulting alkylphenol polyoxyethylene is from about five to about 25, preferably from about eight to about 20.

Oil spills vary greatly as to the amount of oil involved, the thickness of the oil layer and the surface area covered. Small spills can cover less than an acre of surface, while large spills are measured in square miles of surface covered. Moreover, the oil can be distributed into more than one patch and whether distributed in one or more patches the outer configuration of the patch being so irregular and the thickness of the oil within each patch so variable that it is impossible, except in minor spills, to accurately estimate the amount of oil involved in the spill.

In small spills it is possible to accurately estimate the amount of dispersant required to effectively disperse the oil in a stable dispersion. This amount is then applied directly to the oil, such as by spraying, to form the dispersion. It is desirable to use between about 0.1 and about 20 parts and preferably between about one and about 10 parts of the alkylphenol ethoxylate per 1,000 parts of the spilled oil when the amount of the oil can be effectively estimated.

In the large spills, it is impossible, as indicated, to estimate the amount of oil involved in the spill and because of the area covered it is virtually impossible to apply the amount of dispersant required to form a suitable dispersion of the entire oil mass within a comparatively short period of time. In these large spills the dispersant is generally applied to discrete portions of the spill with one or repeated applications of the dispersant over a period of time measured in minutes or hours. The amount of dispersant required is determined, usually visually, to be sufficient when a good dispersion has been obtained for the treated portion. The application of dispersant to another discrete portion is then initiated and carried out in like manner and this procedure is repeated until the entire patch or patches of the spilled oil has been so treated and dispersed. Alternatively, two or more discrete portions of the spilled oil can be treated concurrently as though each is a separate spill. This entire process for the largest oil spills can require as much as several days or longer to treat and disperse the entire spill.

In applying the dispersant to the spilled oil it is convenient to use a suitable sprayer-equipped airplane and utilize the natural wave action of the ocean or body of water to provide the mixing-dispersing effect. If there is little or insufficient wave action the mixing and dispersing can be effected by the agitation of one or more boats passing through the sprayed area. In the alternative the dispersant can also be applied directly to the spilled oil from one or more suitably equipped sprayer boats which traverse the spilled oil one or more times and apply the dispersant by spraying until a stable dispersion has been formed.

It becomes apparent that the application of the dispersant as well as the amount used can be a highly empirical matter. In any event the method involves the application of a sufficient amount of dispersant to the oil spill followed by sufficient agitation of the oil-alkylphenol ethoxylate mixture either by nature wave action or by artificially induced means, such as by ship or helicopter, to form a stable seawater dispersion of the oil. The dispersion formed thereby will be distributed over a wide area by natural water currents with consequent dilution.

As used herein "spilled oil" refers to one or more masses of a significant quantity of a hydrophobic oil which is floating as a liquid on a body of water. It includes unrefined crude oil and refined crude oil products such as bunker oil, gas oil, furnace oil, lubricating oil, kerosene, etc. It also includes vegetable oils such as soy bean oil, corn oil, tung oil, cottonseed oil, etc., fish oils, or animal oils, such as whale oil, etc. Although the spilled oil contamination is most likely the result of accidental or intentional discharges from ocean vessels, it also can result from natural underwater oil leakages, offshore oil drilling operations, underwater pipeline breakage, etc.

Most oil spills in the past have been spills of crude oil or a crude oil product, such as bunker oil, either on the high seas or near a shoreline or in a port. It is anticipated that most future oil spills will be the same types of spills and it is further anticipated that the primary usage of this invention will therefore be for the same types of spills. Thus the process of this invention is adapted for forming stable dispersions of spilled oil in seawater, or in brackish water such as found in bays, estuaries or ports. The process of the invention is also adapted for forming stable dispersions of spilled oil in fresh water such as found in some estuaries and ports as well as fresh water lakes and rivers.

The following examples are presented for the purpose of further illustrating the present invention and are not to be regarded as limitive. Parts are all given by weight unless indicated otherwise.

EXAMPLE 1

A stirred glass reactor was charged with 470 grams (five moles) of phenol and 18.8 grams (0.28 mole) of $BF_3$. The mixture was allowed to stand for about two hours, whereafter 886 grams (2.5 moles) of a $C_{22-28}$ alpha-olefin mixture, whose analysis is set forth below in Table I, was added while stirring over a period of about ½ hour. The temperature of the reaction mixture was maintained at about 60° to 70° C. by means of a steam bath. After digesting for about one hour, the reaction mixture was treated with sufficient caustic solution to neutralize the $BF_3$, and excess phenol was removed by steam distillation. The alkylphenol product was dried by heating to 170° C. with $N_2$ sparging and filtered to remove solids. About 1030 grams of alkylphenol was obtained.

TABLE I

| | |
|---|---:|
| Appearance (D498) | Bright |
| Color, Saybolt (D156) | −8 |
| Congealing point (D938): ° F. | 108.5 |
| Melting point (D127): ° F. | 108.5 |
| Average carbon number | 25.3 |
| Average molecular weight | 354 |
| Penetration at 77° F. (D1321) | 234 |
| Viscosity, SUS (D2161): sec. at 210° F. | 35 |
| Viscosity, kin. (D445): cs. at 210° F. | 3 |

ASTM test numbers are in parentheses.

EXAMPLE 2

In a process similar to that of Example 1, 446.4 grams (1 mole) of a $C_{30}+$ alpha-olefin whose analysis is set forth below in Table II was added over a period of about ½ hour to a mixture of 282 grams (three moles) of phenol and 11.3 grams (0.17 mole of $BF_3$ which had been allowed to stand for two hours. The temperature of the reaction mixture was maintained at about 90° C. by means of a steam bath for about two hours, whereafter 100 milliliters of water was added to the mixture. The $BF_3$ was then neutralized with $Na_2CO_3$ and excess phenol was removed by steam distillation and finally, by vacuum stripping. About 70 grams (0.74 mole) of phenol was consumed in this reaction.

TABLE II

| | |
|---|---|
| Appearance (D498) | Bright |
| Color, Saybolt (D156) | −16 |
| Congealing point (D398): ° F. | 155.6 |
| Melting point (D127): ° F. | 160.5 |
| Average carbon number | 31.9 |
| Average molecular weight | 446 |
| Penetration at 77° F. (D1321) | 13 |
| Viscosity, SUS (D2161): sec. at 210° F. | 53 |
| Viscosity, kin. (D445): cs. at 210° F. | 8 |

ASTM test numbers are in parentheses.

EXAMPLE 3

In a series of experiments, $C_{22-28}$ and $C_{30}+$ alkylphenol mixtures prepared in accordance with Examples 1 and 2, respectively, were treated with Na metal at a temperature of about 120° C. accompanied with $N_2$ sparging. The Na was completely consumed in about ½ hour, whereafter the sparging was discontinued, the reaction mixture was heated to the reaction temperature and the addition of ethylene oxide to the reaction mixture was begun. Ethylene oxide was introduced into the reaction mixture during the reaction period, at substantially atmospheric pressure, whereafter the mixture was again sparged with $N_2$ and allowed to cool. The cooled alkylphenol ethoxylate product was a solid at room temperature and was a mixture having a structural formula which may be represented schematically as follows:

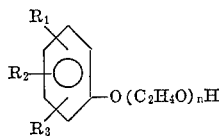

wherein $R_1$, $R_2$ and $R_3$ are a $C_{22-28}$ or $C_{30}+$ alkyl group or hydrogen, at least one of said $R_1$, $R_2$ and $R_3$ being an alkyl group; and $n$ is an integer indicating the average number of moles of ethylene oxide per mole of phenol in the alkylphenol ethoxylate. The data relating to the above series of experiments follow in Table III in which $n$ represents the average number of moles of ethylene oxide in the alkylphenol ethoxylate product in accordance with the general formula.

TABLE III

Ethoxylation of $C_{22-28}$ alkylphenol

| A | B | C | Average reaction temp., ° C. | Reaction time, minutes | n |
|---|---|---|---|---|---|
| 45 | 0.2 | 59.6 | 190 | 35 | 13.6 |
| 90 | 0.3 | 89.9 | 185 | 120 | 10.2 |
| 200 | 0.8 | 263.5 | 170 | 370 | 13.3 |
| 90 | 0.3 | 71.6 | 190 | 90 | 8.2 |

Ethoxylation of $C_{30}+$ alkylphenol

| | | | | | |
|---|---|---|---|---|---|
| 53 | 0.3 | 77.9 | 168 | 160 | 18.7 |
| 53 | 0.3 | 73.4 | 165 | 120 | 16.7 |
| 53 | 0.2 | 45.0 | 180 | 75 | 10.2 |
| 53 | 0.2 | 64.5 | 180 | 120 | 14.7 |
| 106 | 0.5 | 9.3 | 175 | 55 | 1.1 |
| 84 | 0.4 | 34.6 | 175 | 140 | 5.2 |
| 108 | 0.4 | 142.6 | 190 | 170 | 16.2 |

NOTE.—A=alkylphenol in grams; B=sodium metal in grams; C=ethylene oxide in grams.

EXAMPLE 4

In a series of experiments, several $C_{20}+$ alkylphenol ethoxylates prepared in accordance with Example 3 were compared with commercialy available nonylphenol ethoxylates for both surface tension and interfacial tension reducing qualities. Thus, aqueous solutions of the indicated alkylphenol ethoxylates at varous concentrations were made and each respective surface tension and interfacial tension against a heavy mineral oil was determined in accordance with ASTM D1331. These results are set out in Table IV. In addition, the time required for aqueous solution of the indicated alkylphenol ethoxylates to wet a one-inch square of canvas, causing it to sink to the bottom of the vessel containing the solution, was recorded as another indication of the surface activity of the respective products. These results are set out below in Table V. These experiments suggest that neither the $C_{22-28}$ alkylphenol ethoxylates nor the $C_{30}+$ alkylphenol ethoxylates would be suitable as emulsifying agents.

TABLE IV

| A.P.E. Alkyl | n | Concentration, weight percent | Surface tension, dynes/cm. | Interfacial tension, dynes/cm. |
|---|---|---|---|---|
| $C_{22-28}$ | 10.2 | 0.00 | 72 | 51 |
| $C_{22-28}$ | 10.2 | 0.01 | 48 | 24 |
| $C_{22-28}$ | 10.2 | 0.01 | 45 | 17 |
| $C_{22-28}$ | 13.6 | 0.01 | 51 | 22 |
| $C_{22-28}$ | 13.6 | 0.1 | 44 | 19 |
| $C_{30}+$ | 10.2 | 0.001 | 53 | 36 |
| $C_{30}+$ | 10.2 | 0.01 | 67 | 31 |
| $C_{30}+$ | 10.2 | 0.1 | 51 | 17 |
| $C_{30}+$ | 10.2 | 1.0 | 49 | 14 |
| $C_{30}+$ | 14.7 | 0.001 | 59 | 33 |
| $C_{30}+$ | 14.7 | 0.01 | 55 | 25 |
| $C_{30}+$ | 14.7 | 0.1 | 53 | 17 |
| $C_{30}+$ | 14.7 | 1.0 | 50 | 15 |
| $C_{30}+$ | 16.7 | 0.001 | 63 | 31 |
| $C_{30}+$ | 16.7 | 0.01 | 56 | 17 |
| $C_{30}+$ | 16.7 | 0.1 | 55 | 14 |
| $C_{30}+$ | 16.7 | 1.0 | 48 | 13 |
| $C_9$ | 6 | 0.1 | 29 | 3 |
| $C_9$ | 9.5 | 0.1 | 31 | 3 |
| $C_9$ | 12 | 0.1 | 32 | 4 |

NOTE.—A.P.E.=Alkylphenol ethoxylate; $n$=Average number of ethylene oxide groups.

TABLE V.—CANVAS-SQUARE WETTING

| A.P.E. Alkyl | n | Concentration, weight percent | Wetting time, seconds |
|---|---|---|---|
| $C_{30}+$ | 10.2 | 0.2 | >120 |
| $C_{30}+$ | 10.2 | 1.0 | >120 |
| $C_{30}+$ | 14.7 | 0.2 | >120 |
| $C_{30}+$ | 14.7 | 1.0 | >120 |
| $C_{30}+$ | 16.7 | 0.2 | >120 |
| $C_{30}+$ | 16.7 | 1.0 | >120 |
| $C_9$ | 6 | 0.2 | <10 |
| $C_9$ | 9.5 | 0.2 | <10 |
| $C_9$ | 12 | 0.2 | <10 |

NOTE.—A.P.E.=Alkylphenol ethoxylate; $n$=Average number of ethylene oxide groups.

As indicated earlier, it is difficult to separate substantially pure alpha-olefins from mixtures of alpha-olefins above 19 carbon atoms and therefore it is more convenient and just as effective to use a mixture of these alpha-olefins rather than the pure compound. Thus, a $C_{22-28}$ fraction is stated as being used in Example E. This merely means that the majority of the alpha-olefins will contain from 22 to 28 carbon atoms with the remainder being alpha-olefins having a carbon number of 20 and greater than 30. The percentage of alpha-olefins having a carbon number of 22 to 28 in the fraction designated as the $C_{22-28}$ fraction is dependent in the efficiency of the fractionation. We have found that an efficiency of fractionation of 85 to 95 percent is readily accomplished. The same principles apply to any other fraction which might be used.

EXAMPLE 5

In a series of experiments, the indicated alkylphenol ethoxylates prepared in accordance with Example 3 were mixed with a crude oil-seawater mixture. The seawater was made by mixing certain salts in appropriate amounts with water. The salts and proportions used were 25.0 g. NaCl; 11.0 g. MgCl$_2 \cdot$6H$_2$O; 4.0 g. Na$_2$SO$_4$ and 1.6 g. CaCl$_2 \cdot$2H$_2$O liter of resulting solution. Five grams of Venezuelan Leona Crude Oil was added to 100 ml. of this seawater in a 250 ml. cylinder. The dispersant was added as a 10 percent solution in a mixture of 75 percent xylene and 25 percent methyl ethyl ketone in most of the experiments. In several experiments a five percent aqueous dispersion was used. The contents were agitated by rotating the cylinder 180° per second for one minute and the time to noticeable separation into phases was noted. The relevant data in connection with these experiments are compiled in Table VI. Also included in Table VI is the data obtained in using two different commercial dispersants. When this experiment was conducted with no dispersant, it was discovered that the oil-water mixture first showed noticeable separation in 30 seconds.

TABLE VI

| A.P.E. | $n$ | Concentration of dispersant based on crude oil, percent | | | | | |
|---|---|---|---|---|---|---|---|
| | | 0.1 | 0.2 | 0.3 | 0.4 | 0.5 | 1.0 |
| | | Time for noticeable separation, minutes | | | | | |
| Alkyl: | | | | | | | |
| C$_{22-28}$ | 8.2 | 3 | 7 | 10 | 11 | 15 | 22 |
| C$_{22-28}$ | 10.2 | 6 | 8 | 14 | 16 | 18 | 20 |
| C$_{22-28}$ | 13.6 | 3 | 8 | 10 | 15 | 21 | 20 |
| C$_{22-28}$ | 13.6 | [1]7 | [1]13 | [1]18 | [1]14 | [1]10 | [1]5 |
| C$_{30}$+ | 5.2 | <1 | <1 | <1 | 1 | 1.5 | 4 |
| C$_{30}$+ | 10.2 | 3 | 6 | 8 | 12 | 16 | 35 |
| C$_{30}$+ | 10.2 | [1]3 | [1]15 | [1]28 | [1]32 | [1]30 | [1]15 |
| C$_{30}$+ | 16.7 | 2 | 8 | 8 | 13 | 13 | 19 |
| A | ------ | 7 | 3 | 4 | 4 | 3 | 4 |
| B | ------ | 2 | 2 | 4 | 6 | 5 | 3 |

[1] Indicates that dispersant was added as a five percent aqueous dispersion.

Note.—A.P.E.=Alkylphenol ethoxylate; $n$=Average number of ethylene oxide groups; A=Dodecylphenol ethoxylate, $n$=about 8 to 10; B= A straight chain tridecyl benzen sodium sulfonate.

These experiments show that substantially stable dispersions of crude oil in water can be formed from the specific alkylphenol ethoxylates described herein.

Since the alkylphenol ethoxylate is a waxy solid, it is most conveniently applied to the oil spill either as an organic solution, or dispersed in a suitable liquid carrier, or partially dissolved and partially dispersed in a liquid solvent-carrier. Factors which may control whether a solvent or carrier is used include the overall economics involved and the precise equipment and materials available to apply the material under emergency conditions.

As indicated, a simple water dispersion of the dispersant can be easily formed and used. If more concentrated mixtures are desired, a combined solution-dispersion can be produced, provided the necessary equipment for doing this is available. The same applies with organic solvents, that is, a solution can be used or a combined solution-dispersion or dispersion can be formed if more concentrated mixtures are desired and if the equipment is available. Suitable solvents and/or carrier liquids include any fluid hydrocarbon which is available in the quantities required, which is of proper viscosity and is not too costly. These include the paraffins, including hexane, heptane, gasoline, kerosene, naphtha; alcohols such as methyl, ethyl and propyl alcohol; ketones such as acetone, methyl ethyl ketone; ethers such as dimethyl ether and diethyl ether; aromatic solvents such as benzene, toluene, xylene and any other organic liquid or mixtures thereof in which the alkylphenol ethoxylate can be dissolved or dispersed or both and which possesses suitable viscosity characteristics for spraying. The carrier liquid should be of a viscosity that it and the alkylphenol ethoxylate contained therein can be readily sprayed onto the spilled oil.

Frequently major oil spills occur at great distances from either the material or equipment needed or the manpower trained to handle oil spills and, therefore, local exigencies may dominate. Conveniently the alkylphenol ethoxylate can easily be stored for long periods of time in strategically located warehouses worldwide so that the dispersant is readily available in the emergency conditions associated with an oil spill.

It should be understood that the above examples are merely illustrative of the principles of the present invention and that various modifications may be made in the examples given without departing from the spirit and scope of the invention as defined in the following claims.

We claim:

1. In a process for the dispersion of spilled oil on water which comprises the step of applying to at least a portion of said spilled oil a sufficient amount of an alkylphenol ethoxylate composition having the general formula

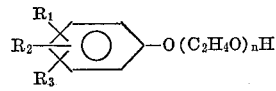

wherein $n$ is an integer from about five to about 25, $R_1$ is a group having at least 20 carbon atoms, and $R_2$ and $R_3$ are independently selected from said alkyl group and hydrogen, and mixtures of said alkylphenol ethoxylates, to form a dispersion with said portion of said spilled oil.

2. A process in accordance with claim 1 in which said alkylphenol ethoxylate is applied in a following step to any spilled oil which is not dispersed in the preceding step.

3. A process in accordance with claim 1 in which the alkylphenol ethoxylate composition is a mixture of alkylphenol ethoxylate compounds comprising predominantly alkyl groups having between 22 and 28 carbon atoms and having an overall ratio of alkyl groups to aromatic rings of 1 to about 1.7.

4. A process in accordance with claim 1 in which the alkylphenol ethoxylate composition is a mixture of alkylphenol ethoxylate compounds comprising predominantly alkyl groups having at least 30 carbon atoms and having an average carbon number of between about 32 and 45 and having an overall ratio of alkyl groups to aromatic rings of 1 to about 1.7.

5. A process in accordance with claim 1 in which said alkylphenol ethoxylate composition is applied to said spilled oil in the amount of about 0.1 to about 20 parts of the alkylphenol ethoxylate composition per 1,000 parts of said portion of said spilled oil.

6. A process in accordance with claim 5 in which the amount of said alkylphenol ethoxylate composition per 1,000 parts of said portion of said spilled oil is between about 1 and about 10.

7. A process in accordance with claim 1 in which said alkylphenol ethoxylate is sprayed onto said oil spill in admixture with water.

8. A process in accordance with claim 1 in which said alkylphenol ethoxylate is sprayed onto said oil spill in admixture with a suitable organic carrier liquid.

9. A process in accordance with claim 1 in which $n$ is between about 8 and 20.

References Cited

UNITED STATES PATENTS

| 3,215,633 | 11/1965 | Grifo | 252—312X |
| 3,272,758 | 9/1966 | Le Lew et al. | 210—42X |
| 3,282,843 | 11/1966 | Alburger | 252—351X |

JAMES L. DECESARE, Primary Examiner

U.S. Cl. X.R.

252—312, 351

PO-1050
(5/69)

UNITED STATES PATENT OFFICE
CERTIFICATE OF CORRECTION

Patent No. 3,577,340    Dated    May 4, 1971

Inventor(s) Stanley C. Paviak and Warren K. Porter, Jr.

It is certified that error appears in the above-identified patent and that said Letters Patent are hereby corrected as shown below:

Column 5, line 18, "Congealing Point (D398):" should read --Congealing Point (D938):--. Column 6, line 4, "commercialy" should read --commercially--. Column 6, line 7, "varous" should read --various--. Column 6, line 60, "Example E" should read --Example 1--. Column 7, line 3, "liter" should read --per liter--. Column 7, line 36, "benzen" should read --benzene--. Column 8, line 23, "a group" should read --a straight chain or substantially straight chain alkyl group--. Column 8, line 65, "Le Lew et al" should read --De Lew et al--.

Signed and sealed this 14th day of September 1971.

(SEAL)
Attest:

EDWARD M. FLETCHER, JR.
Attesting Officer

ROBERT GOTTSCHALK
Acting Commissioner of Patents